(12) United States Patent
Takahashi

(10) Patent No.: US 6,335,993 B1
(45) Date of Patent: Jan. 1, 2002

(54) ROTARY SWITCH TYPE OPTICAL FIBER SWITCH

(75) Inventor: Mitsuo Takahashi, Matsudo (JP)

(73) Assignee: Seikoh Giken Co., Ltd., Matsudo (JP)

( * ) Notice: Subject to any disclaimer, the term of this patent is extended or adjusted under 35 U.S.C. 154(b) by 0 days.

(21) Appl. No.: 09/404,157

(22) Filed: Sep. 27, 1999

(30) Foreign Application Priority Data

Sep. 25, 1998 (JP) .......................................... 10-270662

(51) Int. Cl.[7] .................................................. G02B 6/26
(52) U.S. Cl. ............................ 385/25; 385/15; 385/16; 385/31; 385/60; 385/70; 385/72
(58) Field of Search ............................... 385/16, 17, 19, 385/22, 24, 25, 26, 15, 31, 33, 34, 60, 70, 72, 71

(56) References Cited

U.S. PATENT DOCUMENTS

| 4,378,144 A | | 3/1983 | Duck et al. | |
| 5,317,659 A | | 5/1994 | Lee | |
| 5,633,963 A | * | 5/1997 | Rickenbach | 385/16 |
| 5,664,034 A | * | 9/1997 | Mock | 385/25 |

FOREIGN PATENT DOCUMENTS

| FR | 2 292 294 | 6/1976 |
| JP | 01099016 | 4/1989 |
| JP | 06242349 | 9/1994 |
| JP | 07027986 | 1/1995 |
| JP | 07043623 | 2/1995 |

* cited by examiner

Primary Examiner—Georgia Epps
Assistant Examiner—Tuyen Tra
(74) Attorney, Agent, or Firm—Venable; Robert J. Frank; Gabor J. Kelemen

(57) ABSTRACT

A rotary switch type optical fiber switch according to the present invention includes a plurality of lined-up sleeves disposed on at least one concentric circle about a reference axis and a fixed side ferrule with optical fiber mounting plate assembly for supporting fixed side ferrules with optical fibers. A movable side ferrule with optical fiber assembly supports a movable side ferrule with an optical fiber in parallel with the reference axis at a position apart from the reference axis a distance corresponding to the radius of the concentric circle and rotates about the reference axis as well as is movable in parallel with the reference axis. A movable side ferrule with optical fiber mounting plate driving unit assembly locates the movable side ferrule at the angular position of an arbitrary lined-up sleeve of the fixed side ferrule mounting plate at a position apart from the fixed side ferrule mounting plate to thereby insert the movable side ferrule into the lined-up sleeve and connect it to one of the fixed side ferrules with the optical fibers.

11 Claims, 5 Drawing Sheets

PRIOR ART

ROTARY SWITCH TYPE OPTICAL FIBER SWITCH

BACKGROUND OF THE INVENTION

1. Field of the Invention

The present invention relates to a rotary switch type optical fiber switch for switching and connecting optical signals through a multiplicity of circuits used in the field of an optical fiber communications system, a light measuring instrument and the like.

More specifically, the present invention relates to a novel rotary switch type optical fiber switch which is realized by a multi-circuit optical fiber switch with about 200 switching circuits at maximum that is operated by switching and connecting optical fiber connectors in order to improve the optical capability and reliability of the switch, easily maintain and repair the switch and reduce the size thereof.

2. Description of the Related Art

There have been proposed rotary switch type optical fiber switches for switching and connecting optical signals through a multiplicity of circuits. U.S. Pat. No. 4,378,144 proposes an optical fiber switch for connecting optical signals using collimator lenses. U.S. Pat. No. 5,664,034 also proposes an optical communication monitor switch for connecting optical signals using collimator lenses.

Problems of the rotary switch type optical fiber switch using the collimator lenses will be examined. FIG. 9 is a side sectional view schematically showing the rotary switch type optical fiber switch. The main body of a stepping motor 12 is fixed to a disc-shaped fixed plate 3 and a rotational shaft 13 is rotatably disposed by passing through the center hole 4 of the fixed plate 3. Collimator lens mounting holes 5 to which fixed side collimator lenses 1 are disposed are formed on a circle which is concentric to the center of the disc-shaped fixed plate 3. Optical fibers 2 are fixed to the respective fixed side collimator lenses 1. A movable plate 8 is fixed to the rotational shaft 13 at a center hole 9. A movable side collimator lens 6 is disposed to the movable side collimator lens mounting hole 10 of the movable plate 8 and a movable side optical fiber 7 is connected to the movable side collimator lens 6.

Optical connection is executed by matching the optical axis of the movable side collimator lens 6 with the optical fiber 7 to the optical axis of a desired fixed side collimator lens 1 with an optical fiber 2 by rotating the movable plate 8 through a necessary angle by the stepping motor 12. In the rotary switch type optical fiber switch, it is not necessary to mechanically contact the end surfaces of the fixed side collimator lenses 1 with the fixed side optical fibers 2 with the end surface of the movable side collimator lens 6 with the optical fiber 7. Thus, this type of switch is advantageous in that there is no anxiety that the components will wear because they are not repeatedly in contact with each other and it suffices to use only one stepping motor as a driving power source. Accordingly, the structure of the switch can be simply arranged. In the switch, however, it is required not only to process the fixed plate 3 and the movable plate 8 with pinpoint accuracy and assemble the switch with precise assembling technology but also to provide a multiplicity of expensive collimator lenses with optical fibers.

The optical insertion loss in the connection depends on the matching accuracy of the end surface of a fixed side collimator lens 1 with an optical fiber 2 to the optical axis of the movable side collimator lens 6 with the optical fiber 7. On the other hand, the angular accuracy of the position where a stepping motor stops is at best ±0.05°. When collimator senses are disposed on a concentric circle having a radius of 50 mm, an error of ±42 μm must be expected in the stop position of the stepping motor in a peripheral direction. When a single mode optical fiber (SMF9/125) was used and the dislocation of the optical axes between the respective collimator lenses was 42 μm, the experimental value of the insertion loss measured by the inventor was about 0.65 dB including a Fresnel loss. This value is significant and cannot be ignored. Further, the collimator lenses are fixed to the mounting holes by bonding or soldering to maintain the mounting accuracy. In this case, there is a drawback in that the collimator lenses cannot be maintained and repaired because it is almost impossible to disassemble and remove them.

As described above, there are many problems to realize the rotary switch type optical fiber switch using the collimator lenses.

SUMMARY OF THE INVENTION

An object of the present invention is to provide a rotary switch type optical fiber switch capable of solving the problems of the aforesaid rotary switch type optical fiber switch by realizing a rotary switch type optical fiber switch that does not collimator lenses.

Another object of the present invention is to provide a rotary switch type optical fiber switch including lined-up sleeves disposed on a concentric circle so that the reliability of the switch can be improved and the switch can be easily maintained and repaired.

Still another object of the present invention is to provide a rotary switch type optical fiber switch having APC optical connector (optical connector having a spherical surface polished to an inclined state) parts disposed on a concentric circle.

A further specific object of the present invention is to provide a rotary switch type optical fiber switch using, as the basic components thereof, ferrules with optical fibers which are used as a part of the APC optical connector which have been completed to a high technical level and lined-up sleeves so that the switch has a connecting property as high as that of the APC optical connector.

To this end, according to one aspect of the present invention, there is provided a rotary switch type optical fiber switch, comprising a fixed side ferrule with optical fiber mounting plate assembly having a plurality of lined-up sleeves disposed on at least one concentric circle about a reference axis for supporting fixed side ferrules with optical fibers, a movable side ferrule with optical fiber assembly supporting a movable side ferrule with an optical fiber in parallel with the reference axis at a position apart from the reference axis a distance corresponding to the radius of the concentric circle and rotating about the reference axis as well as movable in parallel with the reference axis, and a movable side ferrule with optical fiber mounting plate driving unit assembly for locating the movable side ferrule at the angular position of an arbitrary lined-up sleeve of the fixed side ferrule mounting plate at a position apart from the fixed side ferrule mounting plate to thereby insert the movable side ferrule into the lined-up sleeve and connect it to one of the fixed side ferrules with the optical fibers.

In the rotary switch type optical fiber switch, the fixed side ferrule with optical fiber mounting plate assembly is arranged such that stepped holes are formed to the surface of a vertically standing flat plate member orthogonally thereto on the same concentric circle or a plurality M (M≧2) of different concentric circles about the center of a bearing hole formed orthogonally to the surface of the flat plate member at positions on the circle or the circles equally divided to N (N≧2) and the lined-up sleeves and the fixed side ferrules with the optical fibers are inserted into the N×M pieces of the stepped holes and detachably fixed therein.

In the rotary switch type optical fiber switch, the movable side ferrule with optical fiber mounting plate assembly comprises a shaft disposed concentrically to the reference shaft and rotating and advancing/retreating passing through the bearing hole of the fixed side ferrule mounting plate assembly, and a movable side ferrule with optical fiber supporting flat plate member disposed orthogonal to the shaft, wherein L pieces (L≧1) of the movable side ferrules with the optical fibers are disposed to the flat plate member on the same concentric circle or a plurality M (M≧2) of different concentric circles about the center of the shaft so as to correspond to the stepped holes formed to the fixed side ferrule mounting plate assembly so that the extreme ends of the ferrules partially project from the surface of the flat plate member.

In the rotary switch type optical fiber switch, the numbers N of the sleeves disposed on the plurality M (M≧2) of different concentric circles formed to said fixed side ferrule mounting plate assembly are even, respectively, the numbers L of the movable side ferrules with the optical fibers disposed on the plurality M (M≧2) of different concentric circles formed to the movable side ferrule mounting plate assembly is odd, respectively, and a first group of the movable side ferrules with the optical fibers which includes L/2 pieces thereof is disposed at a position symmetrical to a second group of the movable side ferrules with the optical fibers which includes L/2 pieces thereof with its mounting angle dislocated 180° from the position of the second group, whereby the rotary switch type optical fiber switch is arranged as an L (M×N) rotary switch type optical fiber switch.

In the rotary switch type optical fiber switch, the movable side ferrule with optical fiber mounting plate driving unit assembly comprises a slide block supported by a base plate which supports the fixed side ferrule with optical fiber assembly so as to be movable in parallel with the reference axis, a stepping motor supported by the slide block so that the output shaft thereof is made concentric to the reference axis with the output shaft coupled with the shaft of the movable side ferrule with the optical fiber, and advancing/retreating means for moving the slide block in parallel with the reference shaft.

In the rotary switch type optical fiber switch, a latching solenoid magnet is used as an actuator for forming the advancing/retreating means of the movable side ferrule with optical fiber mounting plate driving unit assembly and the switch can perform a self-holding operation at a stroke end.

In the rotary switch type optical fiber switch, the movable side ferrule with the optical fiber can be caused to sequentially come into contact with any arbitrary fixed side ferrule with an optical fiber in such a manner that the extreme end of the movable side ferrule with the optical fiber is inserted into a lined-up sleeve hole by the backward movement of the slide block to thereby cause the extreme end of the movable side ferrule to come into contact with the fixed side ferrule with the optical fiber as well as said stepping motor is rotated a prescribed angle in a state that the extreme end of the movable side ferrule with the optical fiber is pulled out from the lined-up sleeve hole to thereby release the contact of the extreme end thereof with the fixed side ferrule.

In the rotary switch type optical fiber switch, the connecting end surfaces of the fixed side ferrules and the movable side ferrules are polished to an inclined spherical surface having an inclination of 4° or more to a surface orthogonal to an optical axis.

DESCRIPTION OF THE PREFERRED EMBODIMENTS

Figure 1:
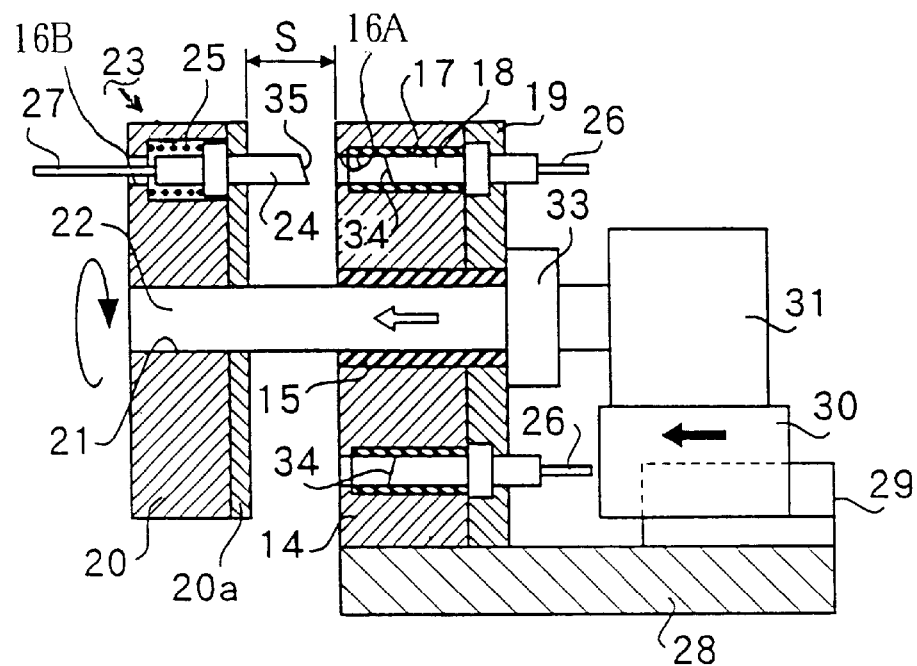
FIG. 1 is a side sectional view of a first embodiment of a rotary switch type optical fiber switch according to the present invention and shows a state wherein a movable side ferrule with an optical fiber is not connected to a fixed side ferrule with an optical fiber.
Figure 2:
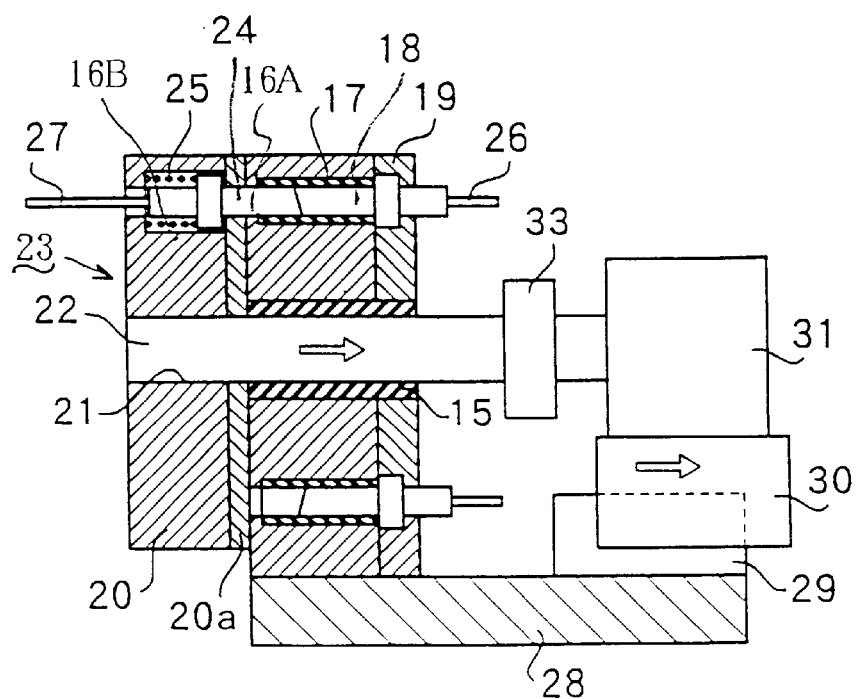
FIG. 2 is another side sectional view of the first embodiment and shows a state wherein the movable side ferrule with the optical fiber is connected to the fixed side ferrule with the optical fiber.
Figure 3:
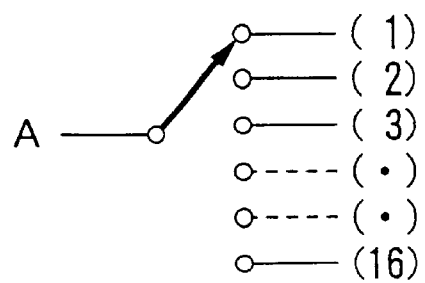
FIG. 3 is a circuit diagram of the first embodiment.
Figure 4:
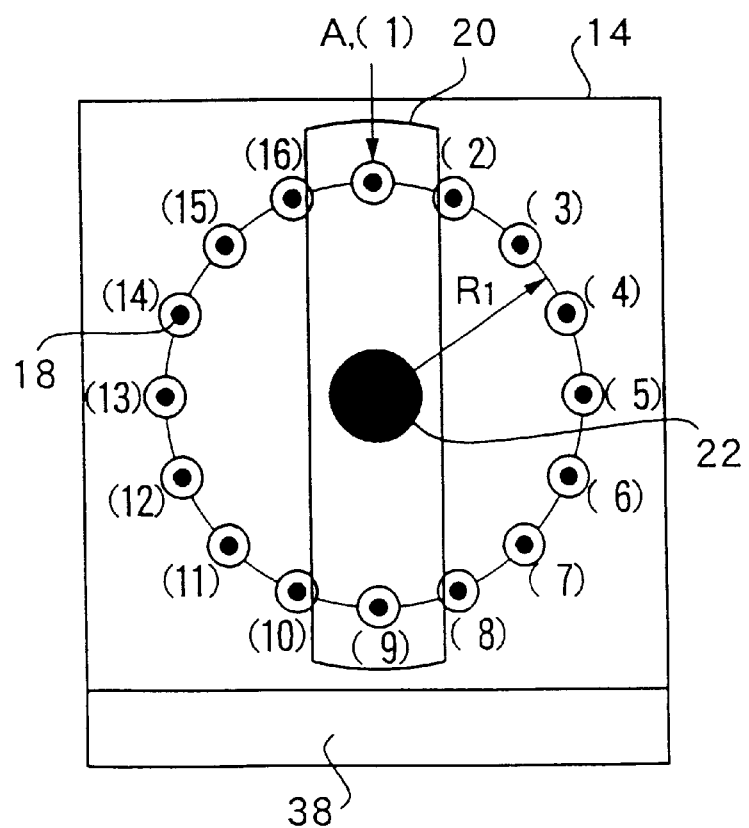
FIG. 4 is a front elevational view of the first embodiment.

Embodiments of a rotary switch type optical fiber switch according to the present invention will be described below in more detail with reference to the accompanying drawings and the like. FIG. 1 is a side sectional view of a first embodiment of the rotary switch type optical fiber switch according to the present invention and shows a state wherein a movable side ferrule with a fiber is not connected to a fixed side ferrule with an optical fiber, whereas FIG. 2 shows a state wherein the movable side ferrule with the optical fiber is connected to the fixed side ferrule with the optical fiber. FIG. 3 is a circuit diagram of the first embodiment and FIG. 4 is a front elevational view of the first embodiment.

The first embodiment is an L×(M×N)=1×(1×16) rotary switch type optical fiber switch having one movable side ferrule (L=1) with an optical fiber and 16 (N=16) fixed side ferrules with optical fibers disposed on one (M=1) concentric circle.

A fixed side ferrule mounting plate assembly is assembled using fixed side ferrule mounting plate 14 as a main component thereof. The fixed side ferrule mounting plate 14 is fixedly mounted vertically on a base plate 28 and a bearing 15 is disposed at the center of the mounting plate 14. Stepped holes 16A are formed in the mounting plate 14 on a circle which is concentric with the center of the bearing 15 (hereinafter, the center is referred to as a "reference axis") and has a radium $R_1$. The small diameter portion of the stepped hole 16A is as large as an inside diameter of a lined-up sleeve 17, whereas the large diameter portion thereof is set to a diameter capable of accurately receiving the outside diameter of the lined-up sleeve 17. There are provided 16 stepped holes 16A at equal angles in the first embodiment. Fixed side ferrules 18 with optical fibers 26 are inserted into the respective lined-up sleeves 17 and are fixed thereto by a ferrule presser plate 19. The removal of the presser plate 19 of the ferrule permits the replacement of the fixed side ferrules with the optical fibers 26. The bearing 15 located at the center of the fixed side ferrule mounting plate assembly supports a rotational shaft 22 so that it can rotate and move in an axial direction. A movable side ferrule assembly which will be described later is driven by the rotational shaft 22.

The movable side ferrule mounting plate 20 of the movable side ferrule assembly is composed of a main body and a presser plate 20a and fixed to the rotational shaft 22 through the center hole 21 thereof. One stepped hole 16B is formed in the movable side ferrule mounting plate 20 at a position apart $R_1$ from the center of the rotational shaft 22. A movable side ferrule 24 with an optical fiber 27 and a coil spring 25 for urging it rightward are inserted into the stepped hole 16B. The flange of the movable side ferrule 24 with the optical fiber 27 is pressed against the presser plate 20a by the coil spring 25. The size of the rotary switch type optical fiber switch according to the present invention is reduced by using lined-up sleeves and ferrules (outside diameter; 0.25 mm) for an MU type optical connector as the movable side ferrule and the fixed side ferrules.

FIG. 2 shows a state wherein a fixed side ferrule 18 with an optical fiber 26 is connected to the movable side ferrule 24 with the optical fiber 27 (for example, the ferrule (1) of FIG. 4) in the first embodiment according to the present invention. That is, FIG. 2 shows a state wherein a slide block 30 is moved backward by a distance S as shown by an arrow to thereby connect the end surface of a fixed side ferrule 18 with an optical fiber 26 to the end surface of the movable side ferrule 24 with the optical fiber 27. The distance S is set so that the contact force applied to the extreme end surfaces of both ferrules is given by the coil spring 25 when they are connected to each other.

The connecting end surface 34 of the fixed side ferrules 18 with the optical fibers 26 and the connecting end surface 35 of the movable side ferrule 24 with the optical fiber 27 of the rotary switch type optical fiber switch of the present invention are each polished to an inclined spherical surface having an inclination of 4° or more to a surface orthogonal to an optical axis in order to prevent an increase of insertion loss due to Fresnel loss when an air gap exists between the surfaces where the optical fiber ferrules are connected to each other. This also greatly reduces the return light reflected from the end surfaces where the optical fibers are connected to each other.

A driving unit assembly for rotating and moving forward and backward the movable side ferrule with an optical fiber mounting plate will be explained. The slide block 30 is disposed on a slide rail 29 of the base plate 28 for supporting the fixed side ferrule having an optical fiber assembly so as to move in parallel with the reference axis. A stepping motor 31 is supported by the slide block 30 so that the output shaft thereof is disposed coaxially with the reference axis. The output shaft of the motor 31 is coupled with the shaft 22 of the movable side ferrule having an optical fiber assembly through a coupler 33. The slide block 30 is driven to the position shown in FIG. 1 and the position shown in FIG. 2 by a not shown actuator. There is used a rotary switch type optical fiber switch which uses a latching solenoid magnet as the actuator and can perform a self-holding operation at the end of a stroke.

FIG. 1 shows a state wherein the slide block 30 moves forward by the distance S as shown by an arrow and a fixed side ferrule 18 with the optical fiber 26 (for example, the ferrule (1) of FIG. 4) is disconnected from the movable side ferrule 24 with the optical fiber 27. When the stepping motor 31 is rotated by a prescribed angle in this state, the movable side ferrule with the optical fiber is rotated to the position of a prescribed fixed side ferrule with an optical fiber and positioned thereat.

FIG. 4 is a front elevational view of the first embodiment, wherein A denotes the movable side ferrule 24 with the optical fiber 27 and (1)–(16) denote the fixed side ferrules 18 with optical fibers 26. FIG. 4 shows that a fixed side ferrule to be connected to the movable side ferrule with the optical fiber A can be sequentially changed by moving the movable side ferrule to the fixed side ferrules with optical fibers (1)–(16).

FIG. 3 is a circuit diagram of the first embodiment and shows the connected states shown in FIG. 4 and FIG. 2. Note, FIG. 1 shows a state wherein the fixed side ferrule 18 with the optical fiber 26 is disconnected from the movable side ferrule 24 with the optical fiber 27 in the first embodiment of the 1×16 rotary switch type optical fiber switch according to the present invention.

FIG. 2 shows a state wherein the movable side ferrule 24 with the optical fiber 27 is connected to the fixed side ferrule 18 with the optical fiber 26 (for example, the ferrule (1) of FIG. 4) in the first embodiment according to the present invention, that is, in the 1×16 rotary switch type optical fiber switch. That is, FIG. 2 shows the state wherein the slide block 30 is moved backward by the distance S as shown by the arrow and the end surface of the fixed side ferrule 18 with optical fiber 26 is connected to the end surface of the movable side ferrule 24 with the optical fiber 27. The distance S is set so that the contact force applied to the extreme end surfaces of both ferrules is given by the coil spring 25 when they are connected to each other.

When an air gap exists between the surfaces where the optical fiber ferrules are connected to each other, an increase of insertion loss due to Fresnel loss must be presented and the return light reflected from the end surfaces where the optical fibers are connected to each other must be greatly reduced. For this purpose, the contact surfaces 34, 35 of the fixed side ferrules with the optical fibers and the movable side ferrule with the optical fiber of the rotary switch type optical fiber switch of the present invention are polished to inclined spherical surfaces having an inclination angle of 4° or more to a surface orthogonal to the optical axis.

Next, a modification of the first embodiment will be described. Referring to FIG. 4, in the modification the movable side ferrule mounting plate 20 is changed to a disc shape and the number L of the movable side optical fibers is increased to 8 pieces and disposed at positions corresponding to (1), (3), (5), (7), (9), (11), (13), (15). Then, an L×(M×N)=8×(1×16) rotary switch type optical fiber switch can be arranged which can switch and connect 8 circuits at the same time by rotating the movable side ferrule mounting plate 20 through 22.5°.

Figure 5:
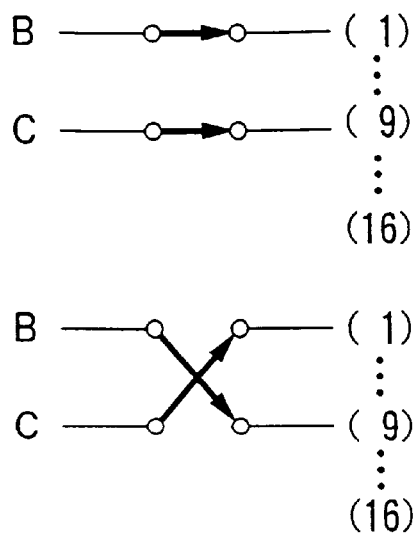
FIG. 5 is a circuit diagram of a second embodiment of the rotary switch type optical fiber switch according to the present invention.
Figure 6:
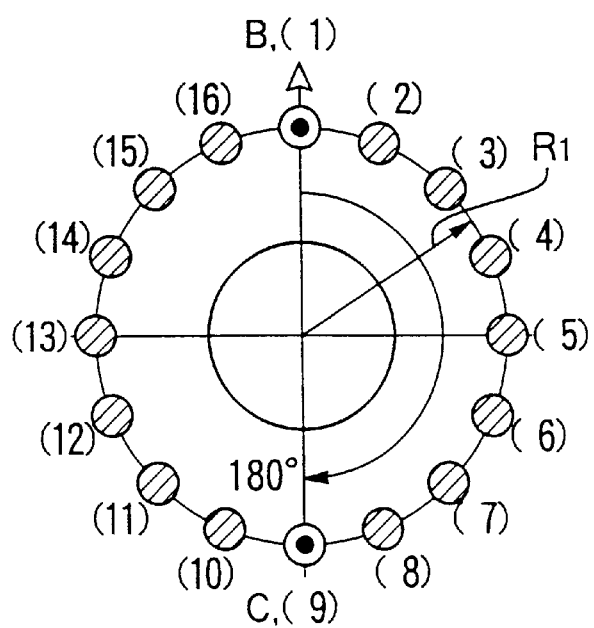
FIG. 6 is a schematic front elevational view of the second embodiment.

FIG. 5 is a circuit diagram showing a second embodiment of the rotary switch type optical fiber switch according to the present invention. FIG. 6 is a schematic front elevational view of the second embodiment. The second embodiment is arranged such that, in the state shown in FIG. 6 corresponding to the first embodiment shown in FIG. 1 to FIG. 4, a movable side ferrule with an optical fiber C is disposed at a position corresponding to the fixed side ferrule with the optical fiber (9) of the movable side ferrule mounting plate 20. In FIG. 5, a first circuit connection is performed in a state of B→(1) and C→(9). When a second circuit connection is performed by switching circuits so that connected circuits cross each other as shown by B→(9) and C→(1), a 2×2 optical fiber switch is arranged as shown in FIG. 5. The switch is an L×(M×N)=2×(1×16) rotary switch type optical fiber switch.

An L×(M×N)=8×(1×16) rotary switch type optical fiber switch can be arranged by disposing 8 pieces of the movable side optical fibers 1–8 as a modification of the second embodiment. This switch can be also understood as 8 sets of 2×2 optical fiber switches which operate in synchronism with each other.

Figure 7:
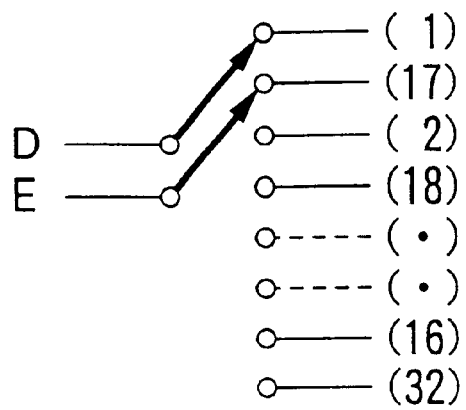
FIG. 7 is a circuit diagram of a third embodiment of the rotary switch type optical fiber switch according to the present invention.
Figure 8:
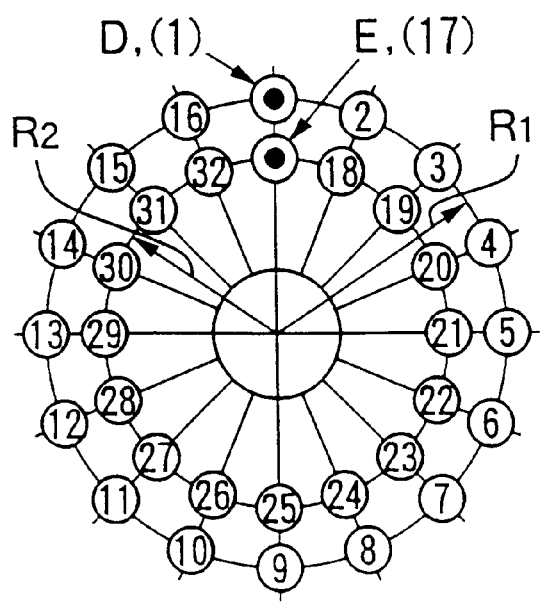
FIG. 8 is a schematic front elevational view of the third embodiment.
Figure 9:
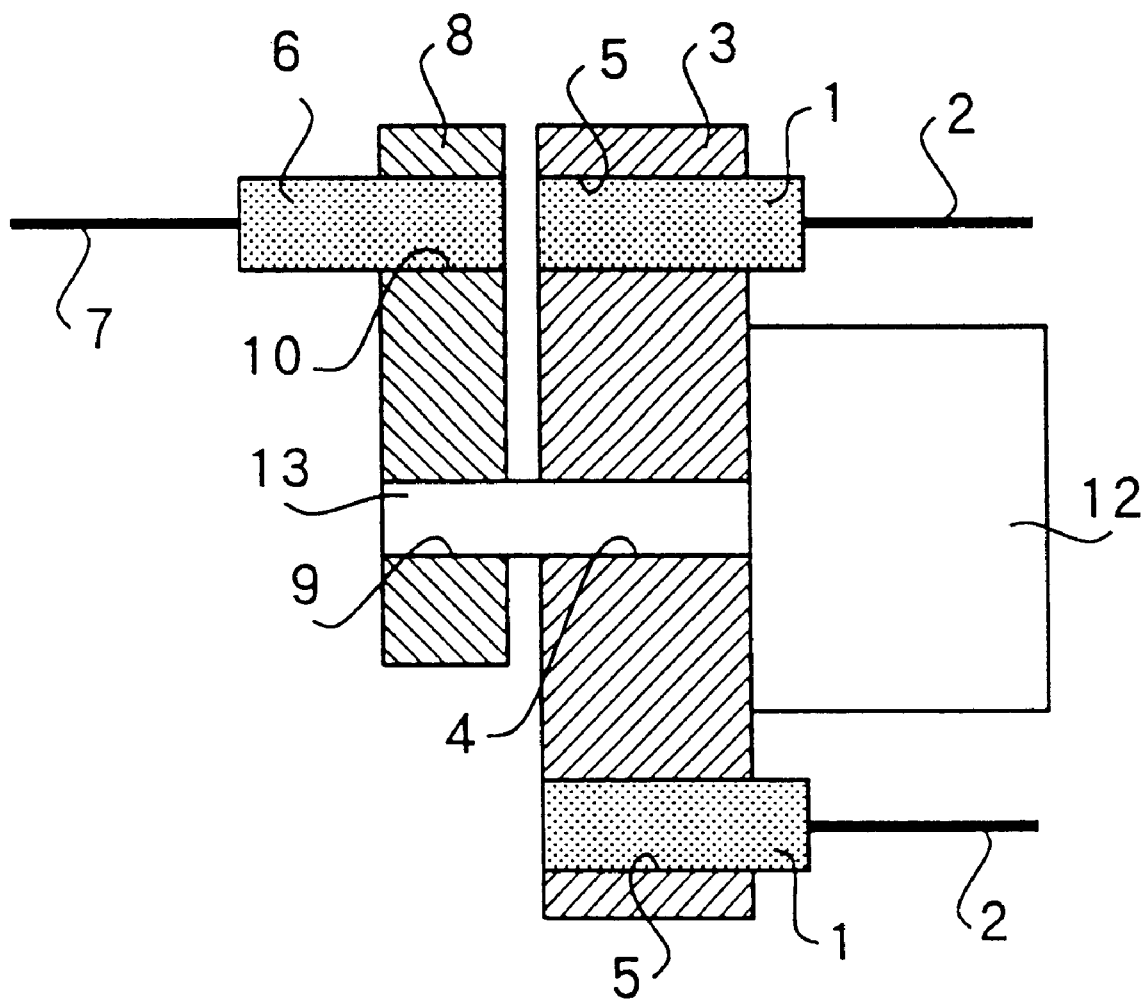
FIG. 9 is a schematic view of a conventional rotary switch type optical fiber switch.

FIG. 7 is a circuit diagram of a third embodiment of the rotary switch type optical fiber switch according to the present invention. FIG. 8 is a schematic front elevational view of the third embodiment. The third embodiment is an L×(M×N)=2×(1×16) rotary switch type optical fiber switch composed of 2 sets of 1×16 rotary switch type optical fiber switches. FIG. 7 is a circuit connection diagram of the 2×(1×16) rotary switch type optical fiber switch. In FIG. 7, D and E denote movable side optical fibers and (1)–(16) and (17)–(32) denote fixed side optical fibers. The movable side ferrules with the optical fibers D and E, which are arranged as one set by the two ferrules, can sequentially connect (D and 2, E and 18), (D and 3, E and 19), (D and 4, E and 20) . . . (D and 16, E and 32) from the connection of (D and 1, E and 17) shown in FIGS. 7 and 8.

Since the rotary switch type optical fiber switch of the third embodiment is arranged such that a plurality of sets of the fixed side ferules with the optical fibers and the movable side ferrules with the optical fibers are disposed on a plurality of concentric circles at the same angular phase, the switch has the following advantages as compared with the rotary switch type optical fiber switch shown in FIG. 5 and FIG. 6.

The volume of the switch structural member can be reduced. Further, the switch is effective in providing reduction of the volume and weight of the movable side ferrule mounting plate 20, reduction of the load on the stepping motor and an increase in the operating speed due to reduction of the turning moment of inertia. When 124 pieces of the ferrules for the MU type optical connector are disposed on the same circle3 at adjacent pitches of 3.5 mm to realize, for example, a 2×124 rotary switch type optical fiber switch by the embodiment shown in FIG. 5 and FIG. 6, the necessary diameter of the circle is about 138 mm. When the above switch is realized by the type of switch shown in FIG. 7 and FIG. 8 gby disposing each of the 62 pieces of the ferrules on circles having radii $R_1$ and $R_2$ with the adjusting pitches of the inner circle having the radius $R_2$ set to 3.5 mm, the necessary diameter of the inner circle is about 69 mm whereby the size of the switch can be remarkably reduced.

It goes without saying that various modifications can be made to the embodiments described above in detail within the scope of the present invention. For example, although examples using APC ferrules are shoen, ordinary PC ferrules may be used.

As described above in detail, the rotary switch type optical fiber switch of the present invention uses, as the basic components thereof, ferrules with optical fibers which are part of an APC optical connector (optical connector having a spherical surface polished to an inclined state) which have been completed to a high technical level and lined-up sleeves. Accordingly, the feature of the rotary switch type optical fiber switch of the present invention can be summarized as follows when it is compared with the conventional collimator lens type rotary switch type optical fiber switch.

There can be provided a rotary switch type optical fiber switch of high reliability having an optical capability such as an insertion loss, reflected return light, and the like which is similar to that of the APC optical connector.

Since any arbitrary fixed side ferrule with an optical fiber or any arbitrary movable side ferrule with an optical fiber can be optionally mounted on and dismounted from the fixed side ferrule mounting plate or the movable side ferrule mounting plate, the ferrule can be easily replaced and repaired when it fails.

What is claimed is:

1. A rotary switch type optical fiber switch, comprising:
    a base plate;
    a fixed side ferrule assembly including
        a fixed side ferrule mounting plate supported by said base plate;
        a plurality of sleeves disposed within said fixed side ferrule mounting plate on at least one fixed side concentric circle having a center on a reference axis; and
    a plurality of fixed side ferrules positioned within said plurality of sleeves, each of said plurality of fixed side ferrules having an optical fiber fixed thereto;
    a movable side ferrule assembly including
        a movable side ferrule mounting plate, said movable side ferrule mounting plate being rotatable about said reference axis and displaceable along said axis; and
        at least one movable side ferrule disposed within said movable side ferrule mounting plate in parallel with said reference axis at a position separated from the reference axis by a distance corresponding to the radius of said fixed side concentric circle, said movable side ferrule having an optical fiber fixed thereto; and
    a driving unit assembly including
        a slide block supported by said base plate, said slide block being movable in parallel with said reference axis; and
        a stepping motor supported by said slide block, said stepping motor having an output shaft, concentric with said reference axis, coupled to said movable side ferrule mounting plate for rotation thereof, whereby rotation of said movable side ferrule mounting plate displaces said movable side ferrule to an angular position in alignment with a selected fixed side ferrule, and movement of said slide block inserts the movable side ferrule into the sleeve of the selected fixed side ferrule for connection of an end of the optical fiber fixed to said movable side ferrule with an end of the optical fiber fixed to said selected fixed side ferrule.

2. A rotary switch type optical fiber switch according to claim 1 wherein a bearing hole is provided in said fixed side ferrule mounting plate, said bearing hole being orthogonal to said fixed side ferrule mounting plate and extending along said reference axis, and wherein said plurality of sleeves and fixed side ferrules with associated optical fibers are located within stepped holes formed in the surface of said fixed side ferrule mounting plate, said stepped holes being orthogonal to said fixed side ferrule mounting plate and equally spaced along said at least one fixed side concentric circle.

3. A rotary switch type optical fiber switch according to claim 2 wherein said stepped holes are spaced along M different fixed side concentric circles, where M≧2, and wherein there are N stepped holes on each concentric circle, where N≧2, the sleeves and fixed side ferrules with associated optical fibers being inserted into the M×N stepped holes and detachably fixed therein.

4. A rotary switch type optical fiber switch according to claim 3 wherein said movable side ferrule assembly further comprises:

a movable side shaft, coupled to the output shaft of said stepping motor, disposed within said movable side ferrule mounting plate concentric with the reference axis and passing through the bearing bole of said fixed side ferrule mounting plate; and a plurality of movable side ferrules with associated optical fibers disposed within said movable side ferrule mounting plate on at least one movable side concentric circle having a center on said reference axis, the positions of said movable side ferrules on said movable side concentric circle corresponding to the positions of the stepped holes formed in said fixed side ferrule mounting plate, the moving side ferrules partially projecting from a surface of said movable side ferrule mounting plate.

5. A rotary switch type optical fiber switch according to claim 4 wherein N is an even number, and wherein the number of movable side ferrules L is equal to N/2.

6. A rotary switch type optical fiber switch according to claim 4 wherein two movable side ferrules are disposed within said movable side ferrule mounting plate on said at least one movable side concentric circle, said two movable side ferrules being positioned on said movable side concentric circle at locations separated by 180° with respect to each other.

7. A rotary switch type optical fiber switch according to claim 4 wherein the fixed side ferrules and the movable side ferrules are disposed on equal numbers of fixed and movable concentric circles respectively, the angular displacement of the movable side ferrules with respect to the angular displacement of corresponding fixed side ferrules being the same.

8. A rotary switch type optical fiber switch according to claim 4 wherein the fixed side ferrules and the movable side ferrules are disposed on M concentric circles, a single movable side ferrule being located on each movable side concentric circle at the same angular displacement.

9. A rotary switch type optical fiber switch according to claim 4, wherein connecting end surfaces of the fixed side ferrules and the movable side ferrules are polished to an inclined spherical surface having an inclination of at least 4° to a surface orthogonal to optical axes of said ferrules.

10. A rotary switch type optical fiber switch according to claim 1 wherein said slide block is translated forward and backward along said reference axis by a latching solenoid magnet which latches at the end of each forward and backward movement.

11. A rotary switch type optical fiber switch according to claim 1 wherein rotation of said stepping motor sequentially moves said movable side ferrule into proximity with a selected fixed side ferrule, and wherein a backward movement of said slide block causes an end of said movable side ferrule to be inserted into a sleeve positioning said selected fixed side ferrule thereby bringing the end of said movable side ferrule into contact with an end of said selected fixed side ferrule, and wherein a forward movement of said slide block withdraws said movable side ferrule from said sleeve thereby releasing contact of the end thereof with the end of said fixed side ferrule.

* * * * *